United States Patent Office 3,399,258
Patented Aug. 27, 1968

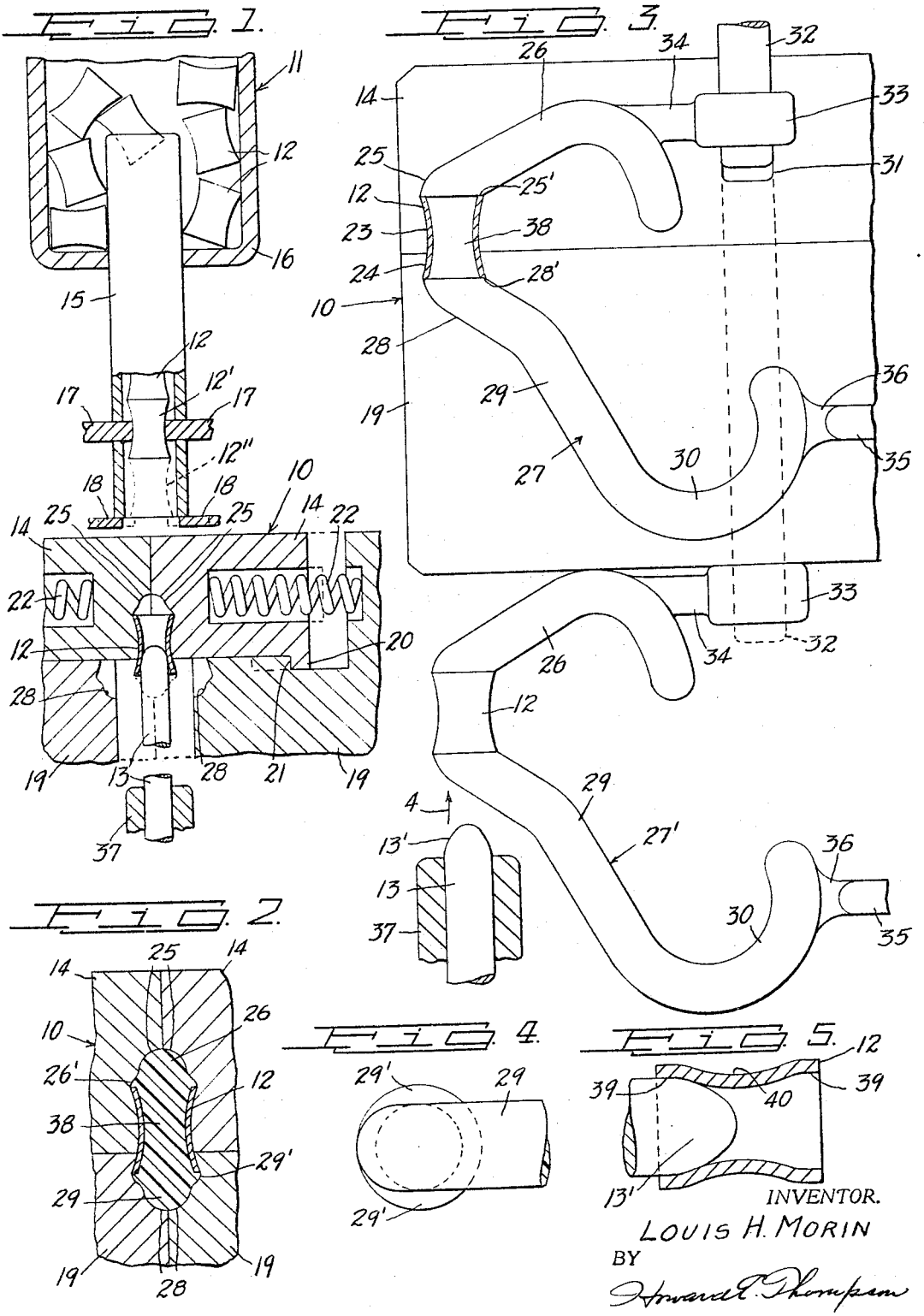

3,399,258
METHOD OF AUTOMATICALLY PRODUCING MOLDED TRAVELERS WITH WEAR RESISTANT INSERTS
Louis H. Morin, Bronx, N.Y., assignor to Coats & Clark Inc., New York, N.Y., a corporation of Delaware
Filed Sept. 29, 1965, Ser. No. 491,312
16 Claims. (Cl. 264—161)

ABSTRACT OF THE DISCLOSURE

A method and apparatus for injection molding a traveler with a wear resistant insert by employing two pairs of dies, a transfer rod and a carrier rod. One pair of dies initially supports an insert delivered by the transfer rod, in the cavity portion of said dies. The transfer rod is removed and the second pair of dies is then closed around a part of the insert supported in the first pair of dies to complete the mold cavity. Plastic material is then injected into the completed cavity of both pairs of dies. During the molding the carrier rod is positioned between the first pair of dies and is used to move the molded product to a trimming and stripping station.

This invention deals with molded travelers employing hollow hourglass-shaped wear resistant inserts. More particularly, the invention deals with a method employing two pairs of dies and wherein one pair of dies is utilized initially for support of an insert in the cavity portion of said pair of dies when the insert is delivered to position between said pair of dies by a transfer rod wherein, upon the removal of said rod, after support of the insert by said pair of dies, the second pair of dies are moved into position around a portion of the insert in completing the mold cavity of the molded traveler to be formed and, then, in injecting the plastic material into the complete cavity of both pairs of dies through a sprue entering the second named pair of dies.

Still more particularly, the invention deals in a method, wherein an automatic hopper feed is provided for delivering inserts into a discharge tube of the hopper, with means on said tube for controlling transfer of the inserts one at a time upon the transfer rod employed for properly positioning each insert between the two pairs of dies which are employed.

Further, the invention deals in a method wherein a carrier rod is normally positioned between the first pair of dies, upon which part of the molded material is arranged and wherein said carrier rod is employed for transferring the molded product from the pairs of dies to a stripping and trimming station in production of the resulting end product.

The novel features of the invention will be best understood from the following description, when taken together with the accompanying drawing, in which certain embodiments of the invention are disclosed and, in which, the separate parts or designated by suitable reference characters in each of the views and, in which:

FIG. 1 is a diagrammatic sectional view through the pairs of dies employed and the hopper feed to the dies, with parts of the construction shown in elevation and parts in dotted line positions, one pair of dies being shown in closed position and the other pair of dies in open position in full lines.

FIG. 2 is an enlarged detail sectional view showing both pairs of dies in closed position, with that part of the traveler upon which the insert is positioned shown in section.

FIG. 3 is a diagrammatic face view of the pair of dies illustrating the formation of a traveler between the dies, with the insert shown in section and also illustrating a pre-formed traveler at the ejector and trimming station to clearly illustrate formation of the resulting end product, the carrier rod delivering the molded product to the ejector and trimming station being shown in dotted lines.

FIG. 4 is an enlarged partial view generally looking in the direction of the arrow 4 of FIG. 3; and FIG. 5 is an enlarged sectional view more clearly illustrating the contour of the insert, with one end portion of the transfer rod which is employed arranged in the insert.

In the accompanying drawing, I have shown one adaptation of my invention and, considering FIGS. 1 to 3, inclusive, at 10 is shown a molding station. At 11 is shown an insert delivery station for delivering hollow hourglass-type inserts 12 to the station 10. At this time, it is pointed out that the showing of the inserts 12 in FIGS. 1 to 3, inclusive, is purely diagrammatic to simplify the illustration; whereas, a more accurate showing of the insert is noted in FIG. 5 of the drawing. The inserts 12 are preferably made of metal or any other wear resistant material.

In FIGS. 1 and 3,, at 13 is shown a transfer rod or member for transferring inserts picked up from station 11 for delivery to station 10 initially between one pair of dies 14, which normally are spaced apart sufficiently to provide free passage of the rod 13 into the lower end portion of the discharge tube 15 of the hopper 16 at station 11. The hopper 16 is reciprocated up and down on the tube 15 in the automatic pickup of the inserts 12 for positioning in the tube 15 one upon the other. A pair of stop fingers 17 are movable inwardly and outwardly in the tube 15 and serve to hold one of the inserts 12 at the position 12', shown in FIG. 1 of the drawing, when another pair of fingers 18 are in the position shown in full lines in FIG. 1. However, in releasing the insert from the position 12', the fingers 17 are moved outwardly and the insert will drop into the position 12" shown in dotted lines as and when fingers 18 are in the dotted line position shown. The fingers 17 are then moved inwardly to grip the insert then positioned as at 12'; whereupon, with the dies of station 10 in fully opened position, the rod 13 is raised to engage the insert, as at 12", and then lower the same into the position shown in FIG. 1 between the pair of dies 14, as well as the pair of dies 19 arranged below and at sides of the dies 14.

The dies 14 have a projecting shoulder 20 operating in recessed portions of the dies 19, the shoulders 20 normally abutting stop walls 21 and being urged into this position by springs 22, as clearly illustrated in FIG. 1 of the drawing.

The dies 14 and 19 have cavity portions 23 and 24, respectively, note FIG. 3, which conform with the peripheral contour of the insert 12. The dies 14 have cavities 25 for formation of one hook end 26 of a traveler 27. The dies 19 have cavities 28 for forming the shank 29 and other hook end 30 of the traveler.

The cavities 25 and 28, respectively, are sufficiently large adjacent the traveler to extend over ends of the insert 12, as clearly illustrated at 25' and 28' in FIG. 3 of the drawing. However, considering FIGS. 2 and 4 of the drawing, it will appear that the body portions of the molded parts 26 and 29 of the traveler are generally round and these parts include extended portions 26', 29', note FIG. 2, and 29' of FIG. 4 which extend beyond sides of 26 and 29, respectively, in overlying the ends of the insert 12.

Considering FIG. 3 of the drawing, it will appear that the dies 14 are recessed, as seen at 31, to receive the end of a carrier rod 32, upon which a ring of plastic material employed, as at 33, is formed, the ring joining the hook end 26 in a thin walled web portion 34. At this time, it is pointed out that any suitable plastic material can be employed such, for example, as nylon, Delrin or the like.

Also considering FIG. 3, it will appear that the dies 19 have a gate 35, through which plastic material can be pressure injected into the cavities of the dies, the gate including a thin wall web portion 36. When the molded traveler has been fed into the position shown below the dies 19 at what can be termed the trimming and stripper station, as at 27', by downward movement of the carrier rod 32, shown in dotted lines, the webs 34 and 36, respectively, can be trimmed from the hook ends 26, 30 and the rod 32 then returned to its normal raised position, this operation taking place when the dies 14 and 19 are in a partially open position, with the dies 19 sufficiently closed to permit the ring 33 to be stripped from the rod 32.

Considering FIGS. 1 and 3 of the drawing, it will appear that the rod 13 has a suitable bearing support, as at 37, for guidance of the rod in movement from its raised position, shown in FIG. 1, to its lowered position, as seen in FIG. 3.

The operation will be readily understood from the foregoing description and the following statement.

Assuming that the rod 13 is in the lowered position shown in FIG. 3 and that an insert is in the position shown in dotted lines at 12" in FIG. 1, both pairs of dies 14, 19 will then be in a fully opened position, at least with the dies 14 open to provide free passage of an insert from the dotted position to the full line position of FIG. 1. The rod 13 is then raised to engage the insert 12" supported on the fingers 18. Then the fingers are moved into the full line position and the rod 13 moved downwardly to the position shown in full lines in FIG. 1. At this time, the pair of dies 14 are moved into engaged position securely supporting the insert 12, as seen in FIG. 1. The pin 33 is now lowered and the dies 19 are moved into the closed position shown in FIG. 2 of the drawing and in dotted line position in FIG. 1, the last operation being against the action of the springs 22.

With both pairs of dies in abutting engagement with each other, pressure is applied to securely support these dies in their operative position, preparatory to injecting plastic material through the gate 35 in forming the molded plastic traveler which includes the portion 38 joining the end 26 with the shank 29, the portion 38 filling the bore of the insert, as will clearly appear from a consideration of FIG. 2 of the drawing.

On completion of the molded traveler, including the insert thereon, both pairs of dies are opened sufficiently to clear the completely molded product and the rod 32 is then moved downwardly to the dotted position of FIG. 3; whereupon, the dies 19 are closed sufficiently to provide the stripping of the ring 33 from the rod 32 after the trimming operation has taken place, as previously stated.

Considering FIG. 5 of the drawing, all of the travelers which have been diagrammatically illustrated in the other figures are preferably shaped along the lines here illustrated so that the traveler will have straight bore ends 39 for reception of the rounded end portions 13' of the pins 13. This construction forms the smaller diameter curved central portion 40, as seen in FIG. 5, giving the insert a more or less tubular hourglass formation, as previously described.

Considering FIGS. 2 and 3 of the drawing, it will be apparent that, by locating the traveler on the parting line between the two pairs of dies, the insert seals off this parting line, preventing any flash of the molded material on the parting line. As a matter of fact, the insert extends a substantial degree into each of the pairs of dies, assuring a positive engagement of the pairs of dies with the insert.

With applicant's method, a distinctly new die structure is employed at the molding station of the molding machine, as well as means for delivery of inserts to said molding station. It will also be apparent that this new method and apparatus results in the production of a new type of traveler, the traveler having short and long shanks, including hook end portions, the shanks being integrally joined by the portion of the molded body arranged in the bore of the insert, thus leaving the entire peripheral surface of the hourglass-type of insert exposed between the short and long shanks.

Having fully described my invention, what I claim as new and desire to seure by Letters Patent is:

1. The method of producing molded plastic travelers including a wear resistant insert, which consists in employing an insert delivery station and a molding station having two pairs of relatively movable dies, first picking up an insert from the delivery station and positioning and holding the same between a first pair of dies, with the second pair of dies in open position, then closing the second pair of dies around a part of the insert supported in the first pair of dies to form between both pairs of dies, cavities for a complete traveler, then pressure injecting plastic molding material into the cavities of both pairs of dies and around parts of said insert, forming in conjunction with the molded traveler a ring around a carrier rod positioned between the first pair of dies, utilizing said carried rod to move the molded traveler to a trimming and stripper station when both pairs of dies are in open position, trimming the molded traveler or end product at said trimming station, and then partially closing the second pair of dies in performing the stripper operation, preparatory to returning the carrier rod to its normal position.

2. A method as defined in claim 1, wherein a hopper in said delivery station reciprocates on a delivery tube in automatic delivery and collection of inserts in said tube.

3. A method as defined in claim 2, wherein a pair of movable fingers support an insert at the lower end of said delivery tube for pickup and delivery of an insert to position between said first pair of dies, and supporting an insert adjacent the picked up insert by another pair of movable fingers.

4. A method as defined in claim 3, wherein a transfer rod is employed for picking up inserts at the lower end of the delivery tube of the delivery station for positioning the same between said first pair of dies, and then moving said transfer rod into position permitting the second pair of dies to move into closed position about the insert supported by the first pair of dies.

5. A method as defined in claim 4, including the step of yieldingly supporting the first pair of dies in the second pair of dies for relative movement of the pairs of dies one with respect to the other.

6. In the formation of molded plastic products including inserts, the method of automatically picking up an insert from an insert delivery station to a predetermined position between a first pair of dies at a molding station, then closing said first pair of dies around the insert in support of the insert by said first pair of dies, with part of the insert projecting beyond said first pair of dies, then moving a second pair of dies into position engaging the projected part of the insert, then with both pairs of dies held in closed position around said insert pressure injecting plastic material into cavities of the dies in forming a resulting molded end product, including the insert as a part thereof, then separating both pairs of dies and moving the molded end product by a carrier rod to a trimming and stripper station, trimming parts from the molded end product at the trimming station, and then stripping at least one of said parts from the carrier rod, preparatory to returning the carrier rod to its initial position.

7. A method as defined in claim 6, including the step for supporting an insert at a pickup position in said insert delivery station, and utilizing a transfer member for picking up the insert at said station in its delivery to position between said first pair of dies.

8. A method as defined in claim 7, wherein said transfer member is moved into inoperative position in closing the second pair of dies around the projecting part of said insert.

9. A method as defined in claim 8, wherein a reciprocating hopper is utilized in delivery of inserts to the pickup position at said delivery station.

10. A method as defined in claim 7, wherein yieldable means is employed in controlling part of relative movement of the first pair of dies with respect to the second pair of dies.

11. In the formation of molded plastic products including inserts, the method of automatically picking up an insert from an insert delivery station to a predetermined position between a first pair of dies at a molding station, then closing said first pair of dies around the insert in support of the insert by said first pair of dies, with part of the insert crossing the parting line between the two pairs of dies and projecting beyond said first pair of dies, then moving a second pair of dies into position engaging the projected part of the insert, utilizing the insert to seal off the parting line between said pairs of dies, then with both pairs of dies held in closed position around said insert pressure injecting plastic material into cavities of the dies in forming a resulting molded end product, including the insert as a part thereof, then separating both pairs of dies and moving the molded end product by a carrier rod to a trimming and stripper station, trimming parts from the molded end product at the trimming station, and then stripping at least one of said parts from the carrier rod, preparatory to returning the carrier rod to its initial position.

12. A method as defined in claim 11, including the step of molding plastic material through said tubular insert in the molding operation.

13. In apparatus for molding plastic products including tubular inserts, a molding station comprising two pairs of dies arranged one upon another, an insert delivery station adjacent said dies, a transfer rod and means for moving it toward and from the insert delivery station and between said pairs of dies, said delivery station having means suporting an insert in position to be picked up by said rod and then released for delivery of the insert into position between a first pair of dies moved into gripping and supporting engagement with said insert with a second pair of dies in open position, means for actuating both pairs of dies, said rod being then moved into position clearing the second pair of dies, said second pair of dies being then moved into closed position and partially engaging a part of the insert projecting beyond boundaries of said first pair of dies, both pairs of dies having cavity portions joined in a bore extending through a tubular insert supported between said dies, means for pressure injecting molding material into the cavities of the dies and said bore of the insert in forming a predetermined molded body including said insert, and a carrier rod arranged between at least one pair of dies, upon which a portion of the molded body is arranged, means for utilizing said carrier rod for movement of the molded body to a trimming station for trimming the molded body in producing a resulting end product including said insert.

14. An apparatus as defined in claim 13, wherein said first pair of dies include springs operatively engaging the second pair of dies and controlling movement of said first pair of dies.

15. An apparatus as defined in claim 13, wherein the pairs of dies define a parting line therebetween, sealed by the positioning of the insert between said dies, and at least part of the parting line between each pair of dies being sealed by said insert.

16. An apparatus as defined in claim 15, wherein said pairs of dies include interengaging means controlling relative movement of one pair of dies with respect to the other pair of dies.

No references cited.

ROBERT F. WHITE, *Primary Examiner.*

S. I. LANDSMAN, *Assistant Examiner.*